United States Patent
Holopainen et al.

(10) Patent No.: US 10,391,428 B2
(45) Date of Patent: Aug. 27, 2019

(54) PRESSURE FILTER WITH A FLOW DISTRIBUTOR AND A METHOD FOR WASHING THE PRESSURE FILTER

(75) Inventors: Ilkka Holopainen, Savonlinna (FI); Jari Paykkonen, Savonlinna (FI)

(73) Assignee: Andritz Oy, Helsinki (FI)

( * ) Notice: Subject to any disclaimer, the term of this patent is extended or adjusted under 35 U.S.C. 154(b) by 1063 days.

(21) Appl. No.: 13/422,314

(22) Filed: Mar. 16, 2012

(65) Prior Publication Data
US 2012/0234775 A1 Sep. 20, 2012

(30) Foreign Application Priority Data
Mar. 16, 2011 (FI) .................................. 20115262

(51) Int. Cl.
*B01D 29/15* (2006.01)
*B01D 29/52* (2006.01)
*B01D 29/66* (2006.01)
*B01D 29/94* (2006.01)

(52) U.S. Cl.
CPC ............. *B01D 29/66* (2013.01); *B01D 29/15* (2013.01); *B01D 29/52* (2013.01); *B01D 29/94* (2013.01); *B01D 2201/0446* (2013.01); *B01D 2201/44* (2013.01)

(58) Field of Classification Search
None
See application file for complete search history.

(56) References Cited

U.S. PATENT DOCUMENTS

| | | |
|---|---|---|
| 3,169,109 A | 2/1965 | Hirs |
| 3,594,992 A | 7/1971 | Carr et al. |
| 3,795,320 A | 3/1974 | Ehret |
| 4,059,518 A | 11/1977 | Rishel |
| 4,243,533 A | 1/1981 | Savolainen et al. |
| 4,401,446 A | 8/1983 | Johnson, Jr. |
| 4,528,103 A | 7/1985 | Spilkin et al. |
| 5,149,449 A | 9/1992 | Strid et al. |
| 2003/0066795 A1* | 4/2003 | Fry et al. ...................... 210/411 |
| 2012/0234775 A1* | 9/2012 | Holopainen et al. ......... 210/791 |

FOREIGN PATENT DOCUMENTS

| | | |
|---|---|---|
| GB | 1 230 833 | 5/1971 |
| JP | 59-042013 | 3/1984 |

OTHER PUBLICATIONS

FI Search Report dated Mar. 15, 2012.

* cited by examiner

*Primary Examiner* — Robert J Popovics
(74) *Attorney, Agent, or Firm* — Nixon & Vanderhye P.C.

(57) ABSTRACT

A pressure filter for treating liquor suspensions of a cellulose pulp mill, the pressure filter including a container having tubular filtering elements suspended in a horizontal plate, through which elements filtrate flows and the interior of which communicates with a filtrate chamber located above. The filtering elements collect on their outer surface precipitate that is arranged to be periodically removed by making the filtrate in the filtrate chamber travel counter-currently through the filtration surface of the filtering elements. The filtering elements are cleaned by wash liquid passing from the filtrate chamber into the filtering elements and through their filtration surface. The interior of the filtering elements is provided with a flow distributor above the middle of a filtering element for distributing the flow from the filtrate chamber onto the filtration surface of the filtering element.

2 Claims, 3 Drawing Sheets

PRESSURE FILTER WITH A FLOW DISTRIBUTOR AND A METHOD FOR WASHING THE PRESSURE FILTER

CROSS RELATED APPLICATION

The application claims priority to Finnish Patent Application No. FI 20115262 filed Mar. 16, 2011, the entirety of which is incorporated by reference.

BACKGROUND

The present invention relates to a pressure filter for treating liquor suspensions of a chemical pulp mill.

When producing chemical pulp by the sulfate method, spent cooking liquor, e.g. black liquor, is evaporated and combusted, and the obtained residual, e.g. soda smelt, is dissolved in water to form green liquor that contains sodium carbonate and sodium sulfide. Green liquor contains insoluble substances, such as metal oxides, which are removed to avoid being enriched in the chemical cycle. The separation of green liquor dregs containing the non-process elements from green liquor typically takes place in a clarifier or a filter. The green liquor dregs are thickened and washed usually in a dregs filter. The cleaned green liquor is causticized into new cooking liquor. In the causticizing, the sodium carbonate in the green liquor reacts with burned lime (CaO).

White liquor containing sodium hydroxide and calcium carbonate (lime mud) thus obtained are separated and the white liquor is circulated to pulp cooking. The separation of white liquor and lime mud can be performed either in a clarifier or by means of filtration. White liquor filters are typically usual sock (candle) filters or disc filters that are either pressure or vacuum filters. The lime mud is washed in order to remove alkali. The lime mud is thickened and washed usually in a lime mud filter for combustion in a calcination apparatus, such as a lime kiln, wherein the lime mud is regenerated to burnt lime (calcium oxide) to be returned back to causticizing.

A pressure filter that has long been used at causticizing plants, such as described above, typically includes tubular filtering elements. These pressure filters have been used for washing lime mud and filtration of white liquor and green liquor. The filtering elements typically include a sock filter.

The liquor suspension, such as lime milk, is pumped into a pressure vessel, wherein the liquor travels through tubular filtering elements into a filtrate chamber, while the lime mud remains on the filtering surface. When the thickness of the lime mud cake on the surface is adequate (e.g. after 3-5 minutes), the liquor filtrate is made to flow to the opposite direction through the filtering elements (e.g. for 1-10 seconds) for releasing the lime mud cake from the filtering surface. After a short while (typically 30 seconds) the lime mud begins to descend towards the bottom of the filtration vessel, and a new filtering cycle may begin. Lime mud is continuously removed from the bottom of the filtration vessel into a washing stage, which usually is a dilution wash, and the lime mud can be separated by means of a similar kind of filter. The remaining lime mud is returned into the feed container for the filter.

In practice, solid substances accumulate on the filtering surface of the filtering element, which are not released during back flushing. This impairs the flow of the filtrate through the filtering surface of the element, which is seen in the pressure increase in the lower part of the filter. Also, the elements may get clogged. To prevent clogging, the filtering elements can be washed.

Washing is conventionally accomplished by means of water and acid washing. An acid mixture in an acid container is circulated through the filter, from up down-wards through the filtering elements. The acid used in the wash is neutralized with sodium hydroxide and led into a weak liquor container. After being washed with the acid mixture, the filter is flushed with water. The filter may also be washed with water prior to acid washing.

During the circulation of the acid mixture, precipitates may flow with the acid mixture and enter the interior of the filtering element. The precipitates should not be on the interior surface of the filtering element. A further problem noticed in washing operations and back-flushing of the filtrate (cake release) is that the washing liquid or filtrate flowing into the interior of the filtering element from up is not distributed evenly, but its pressure is directed to a greater extent to the lower part of the element. Thus, precipitate cake remains on the outer surface of the upper part of the filtering element.

SUMMARY OF INVENTION

There is a long felt desire to eliminate above mentioned problems. A filter and method have been conceived to intensify the flow of liquid (washing liquid or filtrate) inside the filtering element and thus improve the release of the filtrate cake from the filtering element and the cleaning of the filtering surface.

In the filter, the interior of the tubular filtering elements is provided with a flow distributor arranged above the middle part of the filtering element, which distributes the flow led from the filtrate chamber onto the filtering surface of the filtering element.

The flow distributor equalizes the flow through the filtering surface of the filtering element. By equalizing the flow, the filtering surface is efficiently cleaned along its entire surface. Without a flow distributor, the flow entering from above the filtering element is applied mainly to the lower part of the element and to a lesser extend to the upper part of the filtering element. The unequal flow in the filtering element results in less effective cleaning of the upper part of the filtering element as compared to the lower part. To remedy the difficulties associated with unequal flow distribution, the flow distributor equalizes the velocity profile of the flow in the filtering element and proximate to it outside thereof, which intensifies the cleaning of the filtering surface. The cleaning result is uniform in the area of the filtering surface.

A pressure filter has been conceived for treating liquor suspensions of a chemical pulp mill. The filter includes a container with an inlet conduit provided with a feed pump for feeding the liquor to be filtered into the filter under pressure and an outlet conduit for discharging thickened suspension, and a number of tubular filtering elements suspended from a horizontal plate, through which elements the flow of filtrate takes place, and the interior of which elements communicates with a filtrate chamber located above and the filtrate is arranged to be discharged during the filtration stage via a filtrate outlet conduit extending from the filtrate chamber, and the filtering elements collect on their outer surface precipitate that is arranged to be periodically removed by making the filtrate in the filtrate chamber to flow counter-currently through the filtering elements.

According to an embodiment, the flow distributor is a circular plate having a diameter smaller than that of the filtering element. Preferably the diameter of the plate is 55-80%, preferably 60-75% of the inner diameter of the element. The plate is not to prevent efficient flow in the element. On the other hand, the plate has to be large enough for guiding the flow so that the pressure of the flow is also directed to the filtering surface of the upper part of the element for releasing the material remaining stuck on the filtering surface. The plate retains the flow so that the pressure of the flow has time to also be directed to the upper part. The flow distributor plate is mounted vertically in the longitudinal direction of the tubular filtering element at the middle part of the element or above it.

According to an embodiment, the flow distributor plate is connected or supported to the filtering element by means of an elongated piece, such as a rod that is attached to the bottom of the filtering element.

According to an embodiment, the outer circumference of the flow distributor plate is provided with protrusions at a distance from one another, by means of which the flow distributor is supported onto the inner wall of the filtering element. At the location of these protrusions the diameter of the plate is preferably almost the size of the inner diameter of the element so that said supporting is possible.

A method has also been conceived to clean the filtering elements of a pressure filter, in which filter liquor suspensions of a chemical pulp mill are treated and which comprises a container wherein a liquor to be filtered is fed by means of pumping and wherefrom thickened suspension is discharged and which has a number of tubular filtering elements suspended from a horizontal plate, through the filtering surface of which elements the flow of filtrate takes place into a filtrate chamber located above the elements, from which chamber the filtrate is discharged via a filtrate outlet conduit, and the filtering elements collect precipitate on their outer surface, which precipitate is periodically released by making the filtrate in the filtrate chamber to pass counter-currently through the filtering surface of the filtering elements, and the filtering elements are cleaned at certain intervals by leading cleaning liquid from the filtrate chamber into the interior of the filtering elements and through their filtering surface. The flow led from the filtrate chamber into the filtering elements is distributed onto the filtering surface by means of a flow distributor for cleaning the filtering surface. Thus it can be distributed onto the filtering surface along the whole length of the filtering element.

The flow distribution plate mounted inside the filtering element distributes the flow in the filtering element cleaning stage better along the whole length of the filtering element and thus also to the upper part of the filtering element. As a result, the filtering element is cleaned along its whole length more efficiently. Thus the flow distribution is optimized and the filtering element gets cleaned more efficiently. A problem has been clogging of the upper part of the element, since without mounting the flow distribution plate most part of the flow gets through the lower part of the sock in the cake removal stage.

A pressure filter has been conceived for treating liquor suspensions at a chemical pulp mill, said filter comprising: a container with an inlet conduit configured to be coupled to a source of pressurized feeding liquor and an outlet conduit configured to discharge a thickened suspension; a substantially horizontal plate covering an upper portion of the container; a plurality of filtering elements suspended down from the horizontal plate, wherein the filtering elements each include a porous tubular section, a bottom, an open top and an interior chamber configured to receive filtrate from the container; a filtrate chamber above the substantially horizontal plate and impervious to fluid flowing directly from the container into the filtrate chamber, wherein the open top of each of the filtering elements is in fluid communication with the filtrate chamber, and the filtrate chamber includes a filtrate outlet conduit, and a flow distributor configured to be positioned in the interior chamber of each of the filtering elements and at an elevation above a middle elevation of the filtering element, wherein the flow distributor is configured to create a backpressure in the interior chamber of the filtering elements to the wash flow from the filtrate chamber.

A flow distributor has been conceived for a pressure filter wherein said filter includes a container with an inlet conduit configured to be coupled to a source of pressurized feeding liquor and an outlet conduit configured to discharge a thickened suspension; a substantially horizontal plate covering an upper portion of the container; a plurality of filtering elements suspended down from the horizontal plate, wherein the filtering elements each include a porous tubular section, a bottom, an open top and an interior chamber configured to receive filtrate from the container, and a filtrate chamber above the substantially horizontal plate and impervious to fluid flowing directly from the container into the filtrate chamber, wherein the open top of each of the filtering elements is in fluid communication with the filtrate chamber, and the filtrate chamber includes a filtrate outlet conduit, and the flow distributor comprises: a center body configured to be positioned in the interior chamber of each of the filtering elements and at an elevation above a middle elevation of the filtering element, wherein the center body is configured to create a backpressure in the interior chamber of the filtering elements to the wash flow from the filtrate chamber.

A method has been conceived for a pressure filter including a filter container, a substantially horizontal plate, filtering elements hanging from the plate and filtrate container above the horizontal plate, the method comprising: pumping a liquor suspension generated by a chemical pulp mill into the filter container; passing filtrate liquor from the liquor suspension through porous tubular walls of each of the filtering elements and into an interior chamber in each of the filtering elements; moving the filtrate liquor from the interior chambers of the filtering elements into the filtrate container and out through a discharge of the filtrate container; caking a precipitate on an outer surface of the tubular walls as the filtrate liquor passes through the walls; discharging a thickened liquor suspension from a discharge of the filter container; periodically washing the filtering elements by ceasing the pumping of the liquor suspension into the filter container and injecting a wash liquid into the filtrate container to cause the wash liquid to flow from the filtrate container down into the interior chamber of each of the filter elements and through the porous tubular walls to dislodge the cake of precipitate the outer surface of the tubular walls, and distributing the flow wash liquid in each of the interior chambers by a flow distributor positioned in each of the interior chambers at an elevation above a mid-elevation of the interior chamber.

The filter and filtering method disclosed herein may be embodied to achieve advantages such as:

Intensifying the cleaning of the filtering elements;

Elongating the lifetime of the filtering elements;

Decreasing operational costs (involved with material and replacement work costs);

Increasing the capacity of the filter;

Decreasing the amount of washing water of the filter that is required;

Facilitating the replacement work of the filtering elements (wherein better washed elements allows for easier removal and replacement of the elements);

Providing longer intervals between wash operations;

Intensifying the water washing of the filter;

Improving the cleanliness of the filtrate, since the elements are already cleaner after the water washing prior to acid washing (e.g., circulation of particles to the wrong side of the elements in connection with acid washing is decreased and the success percentage of acid washings is improved), and Replacing acid washing with water washing, which would be a remarkable advantage in view of the continuation of the process, since acid washing required 6-8 hours and water washing only approximately one hour. Thus, interruption of the process required by washing would decrease significantly.

SUMMARY OF DRAWINGS

The present invention is described in more detail by means of an embodiment of the filter according to the invention and with reference to the accompanying figures, in which.

DETAILED DESCRIPTION OF INVENTION

Figure 1:
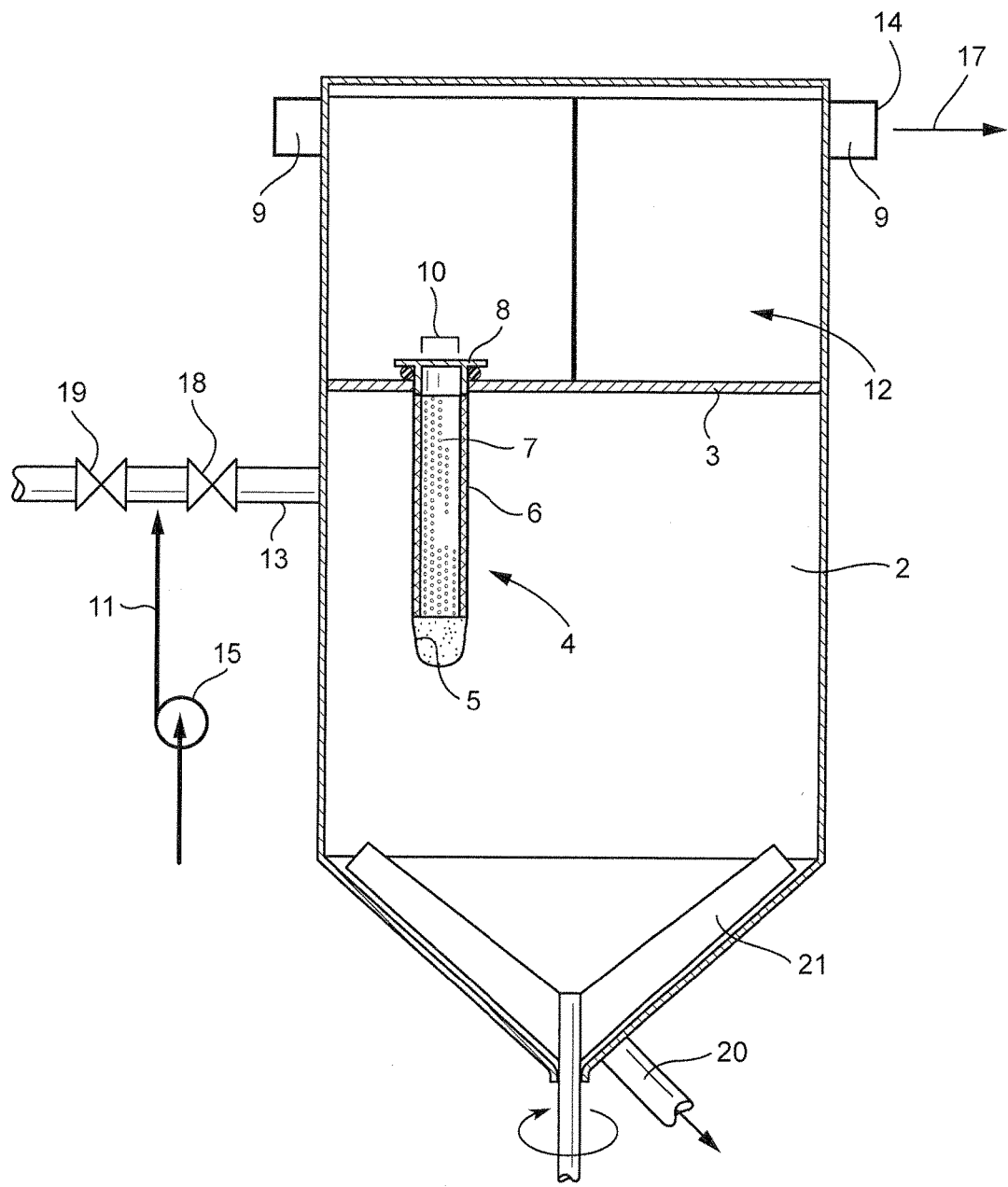
FIG. 1 illustrates a pressure filter provided with tubular filtering elements.

FIG. 1 shows a filter container 2 having a horizontal plate 3 from which hangs tubular filtering elements 4. For illustrative purposes, only one filter element 4 is shown in FIG. 1 and this element is shown in a significantly enlarged view. A large number of filter elements 4, such as 200, may hang from the horizontal plate. The filter elements many be arranged in rows or another array arrangement.

The fluid suspension to be filtered, e.g. such as lime milk, flows into the filter container 2 from a lime milk container (not shown) along inlet pipes 11, 13. A feed pump 15 applies pressure in the inlet pipe 11 to move the suspension to the filter container. While the suspension flows through the filter container, valve 19 is closed and valve 18 open.

The lime milk enters an interior chamber of the filter container from the inlet pipe 13. The lime milk flows over the outer surface of each of the filtering elements 4. The outer surface is of a sock 5, e.g., a porous tube having an open end and a closed end. The sock 5 is fitted over a metallic tube 7 included in the filtering element 4. The sock 5 may be formed of a filtering cloth. The tube 7 may be perforated, mesh or otherwise porous. The tube provides a structural support for the sock and prevents the sock from collapsing. The metallic tube 7 is welded at its upper edge to a flange 8 which is mounted on the horizontal plate 3.

White liquor from the lime milk passes through the porous surfaces of the socks and the metal tubes, and enters an interior region of each of the elements. By flowing through the sock and metal tubes, the while liquor is filtered from the lime milk. The white liquor flows through the socks and metal tubes 7 under prevailing pressure in the filter container 2. Solids, e.g., lime mud from the lime milk, are deposited as a layer 6 on the outer surface of the filtering sock 5. The filtrate, e.g., white liquor, flows up through the interior of each of the filtering elements 4, an open outlet of each element adjacent the flange 8 and into a filtrate chamber 12. The chamber is above the horizontal plate 3. White liquor flows from the filtrate chamber over an overflow edge 9 or other opening at the top of the filtrate chamber 12. From the edge 9 or other opening, the filtrate enters a chute 14 flows via pipe 17 for further treatment.

Periodically the precipitate 6 on the outer surface of the filter sock is removed. The removal of precipitate 6 from the outer surface of the filter sock 5 may be accomplished as follows: The valve 19 is opened to divert flow from the pipe 11 and reduce pressure in the filter container 2. The hydrostatic pressure of liquid in the filtrate chamber 12 forces the filtrate, e.g., white liquor, to flow down into the interior of the filter elements and create a back pressure against the precipitate layer 6 on the socks. The back pressure releases the precipitate from the sock. The releases of the precipitate, also referred to as a cake-removal stage, may last for 2-10 seconds.

After the cake removal stage, a settling stage is performed, such as for 30 seconds. In the settling stage, the valve 18 is closed and valve 19 remains open. The precipitate released from the socks 5 settles at the bottom the filtering container 2. The settled precipitate is removed via outlet conduit 20. A rotating blade 21 prevents the precipitate from sticking on the bottom of the container 2 and assists in moving the precipitate to the outlet conduit. After the settling stage and removal of the precipitate from the filtering container, the filter stage may be resumed by opening valve 18 and closing valve 19.

The feed pump 15 may continually pump lime milk and need not be stopped while the lime mud precipitate is removed from the filtering elements. During the cake-release stage, the pump 15 speed may be slowed and the speed may be slowed further during the settling stage. Just prior to turning the valves 19, 18 for the filtering stage, the rotational speed of the pump 15 is increased to avoid no back flow of lime mud.

The filter is periodically washed. To wash the filter, the filtering container 2 is emptied. Washing is accomplished using a similar process as the cake-release process in that fluid from the filtrate chamber 12 creates a back pressure inside each of the filtering elements 4. The washing liquid may be an acid or water which flows into the filter chamber via filtrate discharge conduit 17. Valves or pipe connections (not shown) direct the washing liquid to the filtrate discharge conduit 17. An acid wash may be repeatedly circulated through the filtrate chamber 12, filtering container 2, outlet 20, an container (not shown) and back to the filtrate discharge conduit 17. In a water-only wash, the water may flow once through the filter and need not be repeatedly circulated through the filtering elements.

Figures 2, 3:
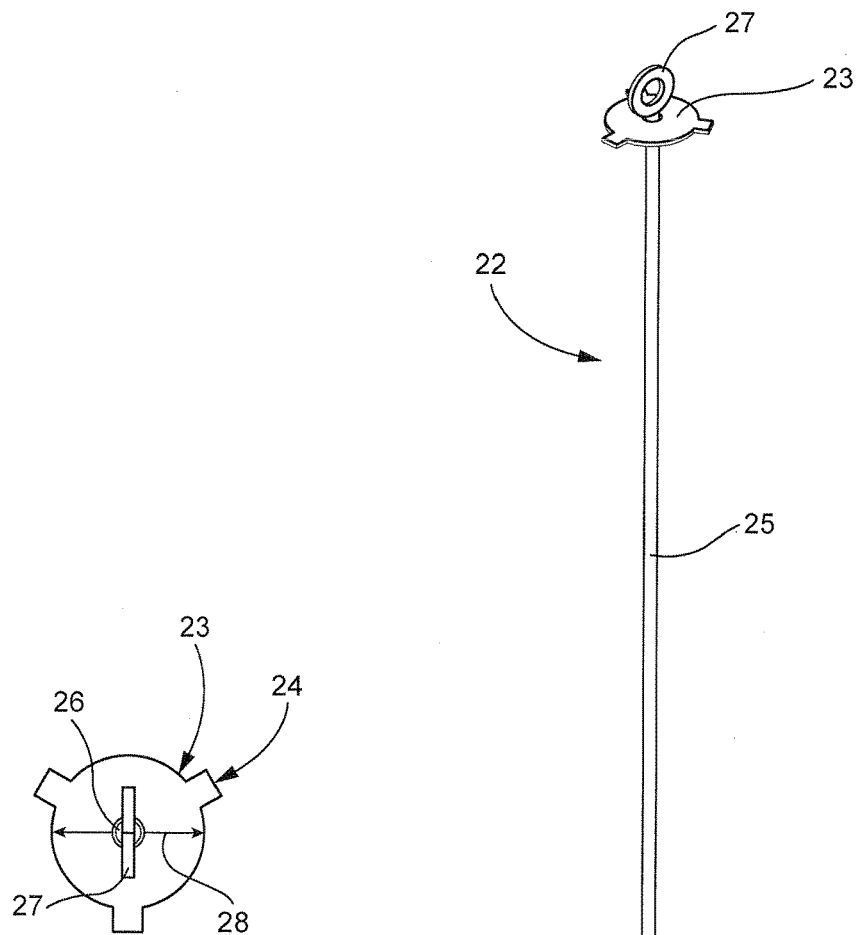
FIG. 2 illustrates a top view of an exemplary flow distributor.
FIG. 3 illustrates a side view of the flow distributor shown in FIG. 2.
Figure 4:
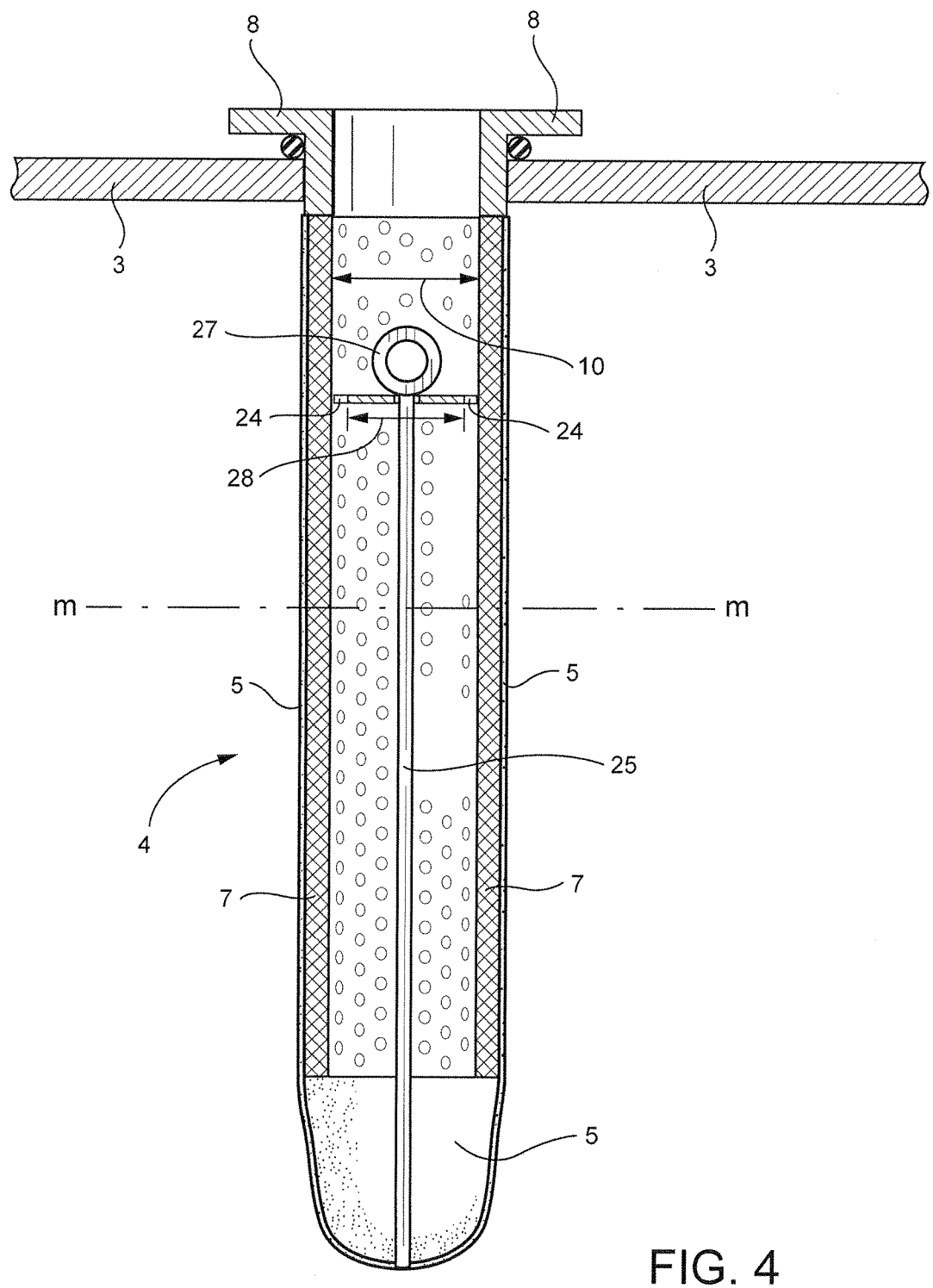
FIG. 4 is a cross-section view of a flow distributor mounted in a filtering element.

FIGS. 2 to 4 illustrate an exemplary flow distributor 22 to be located in a filtering element 4. In FIG. 2, the flow distributor is shown from the above. In FIG. 3 the flow distributor is shown from the side. FIG. 4 shows the flow distributor in a filtering element.

The flow distributor 22 comprises a circular plate 23, the outer circumference of which is provided with protrusions 24, e.g. tabs that may be symmetrically arranged around the perimeter of the circular plate 23. The number of protrusions 24 may be three.

The flow distributor 22 includes a rod 25 that serves as a support member. The middle point of the plate has an opening 26, through which the rod 25 is connected to the plate. The end of the rod has a protrusion 27 that keeps the rod in place over the plate and prevents the rod from sliding down over the rod.

A flow distributor 22 is placed in each of the filtering elements 4 during the washing stage. The flow distributor is supported in a downward direction via the rod 25 extending down into the filter element and in a lateral direction via the protrusions 24 that seat on an inner wall of the filter element. The distal end of the rod seats on the bottom of the sock portion 5 of the filter element. The length of the rod 25 is such that the plate is positioned a desired elevation in the filtering element. The desired elevation is selected to position the plate immediately below an upper region of the sock portion of the filter element and above a mid-elevation (M) of the filtering element.

A flow distributor may be inserting into each of the filtering elements during the washing stage or any other stage. The flow distributor 22 rests loosely in the filtering element. Gravity holds the flow distributor 22 in the filtering element. The flow distributor remains in the filtering element under the force of gravity, since during the filtering stage the flow velocity up through the interior of each of the filtering elements is slow.

The diameter 28 of the plate is smaller than the inner diameter 10 (FIG. 1) of the filtering element. The diameter of the plate is 50-80%, preferably 60-75% of the inner diameter 10 of the filtering element. The diameter of the plate is such that the filtrate liquid passes through a generally annular opening between the plate and the inner surface of the interior of the filtering element. As the wash liquid flows into the interior of each filter element, the plate 23 creates a backpressure in the upper region of the interior of the filtering element. This back pressure assists in causing the solid precipitate on the upper outside surface of the filter elements to release during the wash stage.

The flow distributor plate is mounted inside the filtering element distributes the flow during the cleaning stage of the filtering element. The flow distribution plate better to the upper part of the filtering element and as a result the filtering element is cleaned along its whole length more efficiently, Although the above description relates to an embodiment of the invention that in the light of the present knowledge is considered the most preferred embodiment, it is clear for a person skilled in the art that the invention can be modified in many different ways within the broadest possible scope defined by the appended claims only.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A pressure filter comprising:
   a container connected to an inlet conduit including an inlet configured to be coupled to a source of pressurized feeding liquor in a chemical pulp mill, and connected to an outlet configured to discharge a thickened suspension of the container;
   an impervious plate separating an upper chamber of the container and a lower chamber of the container, wherein the inlet and the outlet are aligned with the lower chamber;
   an opening in the impervious plate;
   a filter tube extending through and filling the opening, the filter tube including a sidewall, bottom and an upper region, wherein the opening is aligned with the upper chamber and at least a portion of the sidewall and bottom extending into the lower chamber is porous so as to be impervious to at least some solids in the feeding liquor and allow liquids in the lower chamber to flow into the upper chamber, and
   a flow distributor within an interior filter chamber defined by the sidewall of the filter tube, wherein the flow distributor has a cross-sectional area configured to create a backpressure in the interior filter chamber,
   wherein the flow distributor includes a circular plate having a diameter smaller than an inner diameter of the interior filter chamber such that an opening is formed between a perimeter of the circular plate and the interior filter chamber, and the circular plate abuts an inner wall of the interior filter chamber, and
   the flow distributor includes an elongated leg located in the interior filter chamber, the elongated leg includes an upper end section supporting the circular plate and a lower end section seated at the bottom of the filter tube such that the elongated leg stands on the bottom to support the circular plate,
   wherein the circular plate and the upper end section of the elongated leg are below an upper region of the filter tube and at an elevation above a middle elevation of the filter tube, and the upper end section of the elongated leg is below and not directly connected to the impervious plate.

2. The pressure filter according to claim 1 wherein the flow distributor includes protrusions extending outward from a perimeter of the circular plate, wherein the protrusions are arranged symmetrically around the perimeter.

* * * * *